(12) United States Patent
Donovan et al.

(10) Patent No.: US 12,303,935 B2
(45) Date of Patent: May 20, 2025

(54) INDICATOR FOR THE SANDING OF JOINT COMPOUNDS AND SPACKLES

(71) Applicant: United States Gypsum Company, Chicago, IL (US)

(72) Inventors: Alexander J. Donovan, Lake Forest, IL (US); Joseph W. Schlude, Vernon Hills, IL (US); Tyler Kincaid, Chicago, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 1555 days.

(21) Appl. No.: 16/662,648

(22) Filed: Oct. 24, 2019

(65) Prior Publication Data

US 2020/0156999 A1    May 21, 2020

Related U.S. Application Data

(60) Provisional application No. 62/768,559, filed on Nov. 16, 2018.

(51) Int. Cl.
| | | |
|---|---|---|
| *E21B 43/34* | (2006.01) | |
| *B05D 3/00* | (2006.01) | |
| *C04B 26/02* | (2006.01) | |
| C04B 103/54 | (2006.01) | |
| C04B 111/00 | (2006.01) | |
| C04B 111/54 | (2006.01) | |

(52) U.S. Cl.
CPC .............. *B05D 3/007* (2013.01); *C04B 26/02* (2013.01); *C04B 2103/54* (2013.01); *C04B 2111/00663* (2013.01); *C04B 2111/00689* (2013.01); *C04B 2111/54* (2013.01)

(58) Field of Classification Search
CPC ..... C04B 26/02; C04B 2103/54; E21B 43/34; B05D 3/007
USPC .......................................................... 116/201
See application file for complete search history.

(56) References Cited

U.S. PATENT DOCUMENTS

| | | | |
|---|---|---|---|
| 2,082,887 | A | 6/1937 | Haydon |
| 4,391,647 | A | 7/1983 | Deer et al. |
| 4,661,161 | A | 4/1987 | Jakacki et al. |
| 5,746,822 | A | 5/1998 | Espinoza et al. |
| 6,358,309 | B1 | 3/2002 | Langford |
| 6,476,099 | B1 * | 11/2002 | Cimaglio ................. C08K 5/41 524/157 |

(Continued)

FOREIGN PATENT DOCUMENTS

| | | | |
|---|---|---|---|
| WO | WO 00/66508 | * | 11/2000 |
| WO | WO2008003672 A1 | | 1/2008 |

*Primary Examiner* — Zakiya W Bates
*Assistant Examiner* — Ashish K Varma
(74) *Attorney, Agent, or Firm* — Greer, Burns & Crain, Ltd; Philip T. Petti; Pradip Sahu (57) ABSTRACT

Joint compounds and spackling compounds which comprise a sanding indicator, the compounds displaying a first color at the surface upon drying/hardening. Methods for finishing a substrate or patching a substrate, the methods comprise applying the joint compound which comprises the sanding indicator and/or the spackling compound which comprises the sanding indicator and sanding the dried/hardened compound until the first color is removed. Accessory products which comprise at least one sanding indicator and methods for making joint compounds and spackling compounds comprising the sanding indicator.

10 Claims, 7 Drawing Sheets

(56) References Cited

U.S. PATENT DOCUMENTS

| | | | |
|---|---|---|---|
| 6,531,528 B1 * | 3/2003 | Kurp | C04B 40/0096 |
| | | | 524/323 |
| 6,545,066 B1 | 4/2003 | Immordino, Jr. et al. | |
| 6,663,979 B2 | 12/2003 | Deodhar et al. | |
| 6,805,741 B1 | 10/2004 | Liu et al. | |
| 8,323,785 B2 | 12/2012 | Yu et al. | |
| 8,642,346 B2 | 2/2014 | Immordino, Jr. et al. | |
| 9,040,612 B2 | 5/2015 | Brandon et al. | |
| 9,174,881 B2 * | 11/2015 | Cimaglio | C04B 28/14 |
| 9,328,023 B2 * | 5/2016 | Rosenthal | C04B 26/04 |
| 9,751,812 B2 | 9/2017 | Bowers et al. | |
| 10,099,961 B2 | 10/2018 | Kincaid et al. | |
| 2009/0229196 A1 * | 9/2009 | Tubervile | E04F 13/04 |
| | | | 52/741.41 |
| 2013/0104797 A1 | 5/2013 | Chiappo | |
| 2014/0249245 A1 * | 9/2014 | Brandon | C07C 37/14 |
| | | | 523/122 |

* cited by examiner

Table 3. ΔE Values of the Sanding Indicators

| Indicator | Indicator Amount (dry %) | Metal Cation | Viscosity (BU) | pH | 2-week Oven Aged ||||||| |
|---|---|---|---|---|---|---|---|---|---|---|---|
| | | | | | Un-sanded L, a, b ||| Sanded L, a, b ||| ΔE |
| | | | | | L | a | b | L | a | b | |
| Thymol Blue | 0.005% | Ca | 888 | 8.91 | 92.05 | 1.23 | 12.58 | 92.98 | 0.84 | 9.84 | 2.92 |
| | | Ca + Mg | 1228 | 9.40 | 92.54 | 1.00 | 11.34 | 93.16 | 0.65 | 9.78 | 1.71 |
| | 0.001% | Ca | 828 | 8.95 | 94.19 | 0.01 | 6.43 | 94.22 | 0.07 | 5.94 | 0.49 |
| | | Ca + Mg | 1212 | 9.41 | 94.26 | 0.10 | 6.86 | 94.26 | 0.09 | 6.87 | 0.01 |
| m-cresol Purple | 0.005% | Ca | 802 | 8.90 | 83.51 | 0.90 | 1.93 | 88.51 | -0.50 | 1.31 | 5.23 |
| | | Ca + Mg | 1059 | 9.43 | 84.61 | -0.30 | 1.37 | 87.86 | -1.24 | 0.07 | 3.62 |
| | 0.001% | Ca | 785 | 8.91 | 91.54 | 0.36 | 3.98 | 92.67 | -0.02 | 3.64 | 1.24 |
| | | Ca + Mg | 1204 | 9.42 | 92.07 | -0.23 | 3.48 | 92.69 | -0.41 | 3.02 | 0.79 |
| Cresol Red | 0.005% | Ca | 870 | 8.89 | 84.85 | 8.79 | 10.48 | 89.73 | 4.11 | 5.70 | 8.28 |
| | | Ca + Mg | 1215 | 9.42 | 85.45 | 8.45 | 9.56 | 89.73 | 4.22 | 4.97 | 7.57 |
| | 0.001% | Ca | 759 | 8.88 | 92.73 | 2.07 | 7.02 | 93.21 | 1.62 | 5.90 | 1.30 |
| | | Ca + Mg | 1165 | 9.45 | 92.50 | 2.49 | 7.06 | 93.62 | 1.40 | 4.87 | 2.69 |
| Bromothymol Blue | 0.005% | Ca | 736 | 8.85 | 93.29 | -1.12 | 10.84 | 93.78 | -0.99 | 9.15 | 1.76 |
| | | Ca + Mg | 1205 | 9.42 | 93.10 | -1.53 | 9.37 | 93.50 | -1.40 | 7.58 | 1.84 |

Fig. 4

| | | | | | | | | | | |
|---|---|---|---|---|---|---|---|---|---|---|
| Bromoxylenol Blue | 0.001% | Ca | 764 | 8.87 | 94.27 | -0.48 | 6.57 | 94.55 | -0.45 | 5.84 | 0.78 |
| | | Ca + Mg | 1146 | 9.43 | 94.34 | -0.54 | 6.18 | 94.61 | -0.47 | 5.41 | 0.82 |
| | 0.005% | Ca | 835 | 8.87 | 92.34 | -2.18 | 12.60 | 93.24 | -1.47 | 8.83 | 3.94 |
| | | Ca + Mg | 1247 | 9.36 | 92.36 | -2.18 | 12.60 | 93.02 | -1.62 | 5.73 | 6.92 |
| | 0.001% | Ca | 834 | 8.94 | 94.36 | -0.50 | 6.51 | 94.42 | -0.41 | 5.59 | 0.93 |
| | | Ca + Mg | 1145 | 9.44 | 94.47 | -0.69 | 5.64 | 94.53 | -0.51 | 4.70 | 0.96 |
| Alizarin Red S | 0.005% | Ca | 882 | 9.03 | 90.11 | 5.43 | 2.42 | 90.49 | 5.13 | 2.27 | 0.51 |
| | | Ca + Mg | 1327 | 9.49 | 90.99 | 4.99 | 2.23 | 90.49 | 5.13 | 2.25 | 0.52 |
| | 0.001% | Ca | 756 | 8.97 | 93.37 | 1.52 | 4.43 | 93.34 | 1.49 | 4.00 | 0.43 |
| | | Ca + Mg | 1168 | 9.52 | 93.55 | 1.53 | 3.98 | 93.72 | 1.62 | 3.48 | 0.54 |

Fig. 4 Cont

Table 4. ΔE Values for Sanding Complexometric Indicators

| Complexometric Indicator | Indicator Amount (dry %) | Metal Cation | Viscosity (BU) | pH | Initial Un-Sanded L, a, b | | | Sanded L, a, b | | | ΔE |
|---|---|---|---|---|---|---|---|---|---|---|---|
| | | | | | L | a | b | L | a | b | |
| Calconcarboxylic Acid | 0.005% | Ca | 1122 | 9.19 | 87.35 | 1.72 | 0.27 | 88.03 | 0.85 | -0.62 | 1.42 |
| | 0.005% | Ca + Zn | 1122 | 7.09 | 92.45 | 0.81 | 2.79 | 92.35 | 0.88 | 2.31 | 0.50 |
| | 0.005% | Ca + Mg | 1207 | 9.68 | 88.19 | 1.18 | -0.02 | 87.94 | 0.85 | -1.03 | 1.09 |
| Murexide | 0.005% | Ca | 1122 | 9.19 | 88.81 | 9.34 | 8.28 | 90.37 | 6.46 | 6.00 | 3.99 |
| | 0.005% | Ca + Zn | 1122 | 7.09 | 91.60 | 2.51 | 13.78 | 91.22 | 2.01 | 12.70 | 1.25 |
| | 0.005% | Ca + Mg | 1207 | 9.68 | 88.59 | 9.33 | 9.45 | 90.23 | 6.23 | 6.39 | 4.65 |
| Eriochrome Black T | 0.005% | Ca | 1122 | 9.19 | 85.05 | 6.25 | 0.72 | 84.91 | 7.47 | -0.79 | 1.95 |
| | 0.005% | Ca + Zn | 1122 | 7.09 | 85.95 | 3.71 | -0.42 | 85.93 | 3.70 | -0.42 | 0.02 |
| | 0.005% | Ca + Mg | 1207 | 9.68 | 85.24 | 6.57 | 0.28 | 84.70 | 8.00 | -1.44 | 2.30 |
| Calmagite | 0.005% | Ca | 1122 | 9.19 | 85.42 | 5.75 | 0.74 | 87.34 | 4.71 | 1.09 | 2.21 |
| | 0.005% | Ca + Zn | 1122 | 7.09 | 87.36 | 4.40 | 1.58 | 88.05 | 4.42 | 1.07 | 0.86 |
| | 0.005% | Ca + Mg | 1207 | 9.68 | 87.57 | 5.01 | 1.38 | 88.16 | 4.56 | 0.85 | 0.91 |

Fig. 5

INDICATOR FOR THE SANDING OF JOINT COMPOUNDS AND SPACKLES

CROSS-REFERENCE TO RELATED APPLICATIONS

This application claims the benefit of priority from U.S. Provisional Patent Application 62/768,559 filed Nov. 16, 2018, the entire disclosure of which is herein incorporated by reference.

TECHNICAL FIELD

This disclosure relates to building construction products, including joint compounds, spackling compounds, coatings, paints, gypsum slurries and plasters, comprising a sanding indicator, and methods for applying these products to a substrate.

BACKGROUND

Joint compounds are commonly used in various construction projects, including for building a wall partition, ceiling and other assemblies. One of the applications for a joint compound is to fill in a seam between two gypsum panels from which a wall is constructed. A great variety of other applications are known, including patching wall defects and repairing cracks. Other patching materials are also known, including spackling compounds and plaster patches.

Two types of joint compounds are generally known: drying-type joint compounds and setting-type joint compounds. Drying-type joint compounds harden by evaporation of water from the compound, while setting-type joint compounds harden as calcium sulfate hemihydrate (also referred to as calcined gypsum) hydrates in the presence of water to form calcium sulfate dihydrate (gypsum). Setting-type joint compounds include those described in U.S. Pat. Nos. 4,661,161, 5,746,822, 6,805,741 and 9,174,881, disclosures of these patents are incorporated herein by reference.

Unlike setting-type joint compounds, drying-type joint compounds are not typically formulated with calcined gypsum. Drying-type joint compounds solidify when water evaporates and the compounds transition from an aqueous state into a solid compound. Many drying-type joint compounds comprise calcium carbonate. Drying-type joint compounds include those provided in U.S. Pat. Nos. 6,476,099, 6,545,066 and 9,328,023, disclosures of which are incorporated herein by reference.

Plaster, which may comprise calcined gypsum and water, is a building material which may be used as a protective and/or decorative coating on walls, ceilings or other structures to form a smooth hard surface when plaster paste sets and hardens. Plaster formulations include those provided by U.S. Pat. No. 2,082,887, which is incorporated herein by reference.

Various coatings, including primer coatings, formulated with gypsum and/or calcium carbonate are also available on the market. Examples of coatings include those provided in U.S. Pat. No. 6,663,979, which is incorporated herein by reference. A water-based gypsum slurry is used for making wallboard and other types of gypsum panels and tiles. Examples of gypsum panels include those provided in U.S. Pat. No. 8,323,785, which is incorporated herein by reference.

Joint compounds are commonly available in ready-mixed or powder forms. A setting-type joint compound can be formulated as a dry powder which is mixed with water prior to its application. Adding water to the dry powder initiates conversion of calcined gypsum into gypsum, which triggers setting and hardening of the joint compound.

A setting-type joint compound can be also formulated with water as a setting-type joint compound in the ready-mixed state. Examples of such compounds are provided in U.S. Pat. No. 9,174,881. The ready-mixed setting-type joint compounds are already pre-mixed with water, yet they can be stored on a shelf for a period of time without setting and hardening. In order to inhibit the setting reaction during storage and transportation, the ready-mixed setting-type joint compounds contain a retarder which may be a chelator that binds calcium ions and prevents a hydration reaction of calcined gypsum into gypsum. An activator is then added to a ready-mixed setting-type joint compound in order to release the calcium ions from complexes with a retarder and to initiate a setting reaction.

In addition to, or instead of a joint compound, a spackling compound may be used for patch-and-repair purposes, and it may provide lower levels of shrinkage. Examples of spackling compounds include those provided in U.S. Pat. Nos. 4,391,647 and 6,358,309, disclosures of these patents are incorporated herein by reference.

Complexometric indicators are ionochromic dyes that undergo a color change in the presence of certain metal cations. Complexometric indicators may be used in complexometric titrations to determine the concentration of metal ions. Murexide (CAS No: 3051-09-0), also called ammonium purpurate, is a complexometric indicator used in analytical chemistry for determining a concentration of calcium ions in solution.

Some commercially available joint compounds and spackles are tinted or colored with an indicator to provide an end-user with a visual cue that indicates the presence of joint compound and a degree of its dryness. U.S. Pat. No. 8,642,346 discloses a tagging material for joint compounds which is detectable in a finished product. U.S. Pat. No. 6,531,528 discloses a ready-to-use patch and repair product that includes a color change indicator such as phenolphthalein (red) and thymolphthalein (blue). The compounds are pH indicators which change their color dependent on changes in pH. U.S. Pat. No. 9,040,612 discloses a color changing caulk having a first color upon application and a second color upon formation of a skin and comprising a pH indicator (phenolphthalein). U.S. Pat. No. 10,099,961 provides an identifiable gypsum-based building product comprising a fluorescent tagging material which can be detected in the finished product optically with a hand-held UV blacklight.

If a tinted or colored joint compound has a color while it is still wet and the color fades away or changes into another color once the compound has dried, this may serve as an indicator of dryness, but undesirable side effects may include the color/tint being visible through subsequent wall decorating such as painting.

After a joint compound or spackling compound has been applied to a substrate and has dried, the joint compound or spackling compound is often sanded. The sanding is a process of smoothing and/or polishing of a substrate covered with a joint compound or spackling compound. Often, the sanding for a dried joint compound is still accomplished manually by an end user, and there are no reliable indicators available that can alert the end user of the degree of completeness and uniformity of the sanded surface.

Thus, there remains the need for tinted or colored joint compounds and spackling compounds with an indicator that produces a removable color which is also sufficient to monitor application of a joint compound to a substrate, the joint compound's dryness and the completeness of sanding.

SUMMARY

These and some other needs are addressed at least in part by this disclosure.

In one aspect, this disclosure provides methods for finishing a substrate. The methods comprise:
a) applying to the substrate a joint compound or a spackling compound comprising a sanding indicator, the joint compound or the spackling compound displaying a first color at the air/joint compound surface, wherein the first color is distinguishable from the substrate's color and wherein the first color at the surface is also distinguishable from a second color of the joint compound beneath the surface; and
b) sanding the surface of the joint compound until the first color is removed from the surface.

The joint compound may be a drying-type joint compound or a setting-type joint compound. In one preferred embodiment, the joint compound is a ready-mixed setting-type joint compound.

In some preferred embodiments of the method, the sanding indicator comprises murexide, cresol red, m-cresol purple, bromoxylenol, thymol blue, or any combination thereof.

In any of these methods, the sanding indicator may be added to the joint compound during manufacturing and/or before the application to the substrate. In any of these methods, the sanding indicator may be added in an amount from 0.001 wt % to 5 wt % of the joint compound total, excluding water.

In some preferred embodiments for the methods, the sanding indicator comprises murexide, cresol red, m-cresol purple, bromoxylenol, thymol blue, or any combination thereof, and the sanding indicator is added to the joint compound during manufacturing and/or before the application to the substrate, and the sanding indicator is added in an amount from 0.001 wt % to 5 wt % of the joint compound total, excluding water.

In some of these methods, the step of sanding comprises detecting the first color with a sensor which is in communication with a processor which initiates the sanding of the surface with the first color by a sanding machine until the sensor detects that the first color has been removed and/or the sensor detects a second color.

Further aspects of this disclosure include a joint compound or a spackling compound comprising: one or more fillers, one or more binders and a sanding indicator, wherein the joint compound or spackling compound displays a first color at the air/joint compound surface after the joint compound or the spackling compound has dried or hardened, wherein the first color is distinguishable from a second color of the joint compound beneath the air/joint compound surface.

The present joint compounds or spackling compounds include those in which the sanding indicator is in an amount from 0.001 wt % to 5 wt % of the joint compound or spackling compound total, and preferably in an amount from 0.001 wt % to 0.005 wt % of the joint compound or spackling compound total, excluding water.

The present joint compounds or spackling compounds include those in which the sanding indicator comprises murexide, cresol red, m-cresol purple, bromoxylenol, thymol blue, or any combination thereof in an amount from 0.001 wt % to 5 wt %, and preferably from 0.001 wt % to 0.005 wt % of the joint compound or spackling compound total, excluding water.

Further aspects of this disclosure include an accessory product for finishing a substrate, comprising a sanding indicator which comprises murexide, cresol red, m-cresol purple, bromoxylenol, thymol blue or any combination thereof dosed for mixing with a joint compound or a spackling compound. The accessory product may further comprise at least one of the following: a solvent, a stabilizer, a carrier, or any mixture thereof. The accessory product may further comprise a setting activator. Suitable setting activators may comprise zinc sulfate, zinc sulfate hydrate, aluminum sulfate, aluminum ammonium sulfate, aluminum potassium sulfate, or any combination thereof.

Further aspects of this disclosure include a method for analyzing the air/joint compound surface of the present joint compound or spackling compound. The method comprises:
1) inspecting the surface for the presence of the first color after the surface was sanded, and
2) determining that some additional sanding is needed if the first color is detected at the surface.

In these methods, the surface may be inspected by visual inspection and/or with a device which detects the first color.

In further aspect, this disclosure provides a method for patching a substrate, wherein the method comprises applying to the substrate the spackling compound comprising at least one sanding indicator according to this disclosure. The method may further comprise sanding the spackling compound after the spackling compound has dried and displays a first color at the air/joint compound interface.

In yet another aspect, the present disclosure provides a method of making the present joint compound or the spackling compound, wherein the method comprises mixing a drying-type joint compound composition, a setting-type joint compound composition or a spackling compound composition with at least one sanding indicator according to this disclosure.

DETAILED DESCRIPTION

This disclosure provides joint compounds and spackling compounds with removable color/tint. The color/tint can be removed during sanding. The disclosure also provides methods of sanding a joint compound or spackling compound and methods for monitoring completeness of sanding. Joint compounds include drying-type joint compounds and setting-type joint compounds. Suitable joint compounds include ready-mixed joint compounds, including ready-mixed setting-type joint compounds.

The present joint compounds and spackling compounds comprise a sanding indicator that can be used to monitor completeness of sanding. The sanding indicator may be a complexometric indicator, pH indicator, fluorescent dye, near-infrared dye, and/or a pigment.

Upon application of the present joint compound or spackle to a substrate, a concentration gradient in color of the sanding indicator is established in the dried joint compound or spackle such that a first color is present at or near the air/joint compound interface. The first color is distinguishable from the substrate to which the joint compound has been applied. For example, the first color may be yellow, while the substrate may be light gray. The first color which is at the surface of the joint compound is also distinguishable from a second color of the joint compound beneath the surface of the joint compound.

In this disclosure, a color is referred to as "distinguishable" if an end-user can observe a difference between the first color and the substrate's color by visual inspection and/or the end user may detect the difference with a device and/or by a chemical analysis. The device may be a device for detection of fluorescent dyes, such as for example, a UV-lamp, and/or a color sensor which transmits information to the end user. A chemical reaction may be any reaction that can be performed onsite and/or in a laboratory to detect the presence of a compound. Preferably, the detection is by visual inspection, where an end-user observes the first color and notices his observation, e.g. the end-user observes the first color as being yellow.

After the joint compound has dried on a substrate, the joint compound can be easily distinguished from the substrate because the first color at the surface of the joint compound can be detected, and the first color is distinguishable from a color of the substrate. After the joint compound has dried on the substrate, the joint compound is sanded. The sanding process removes the surface layer of the joint compound from the substrate. Because the first color is generally present at the surface of the joint compound, the first color is also removed during the sanding. The remaining sanded joint compound on the substrate now reveals a second color.

Accordingly, in one aspect, the present disclosure provides a method for finishing a substrate. The method comprises a step of applying the present joint compound and/or spackling compound to the substrate, sanding the present joint compound or spackling compound, and removing the first color by sanding. The detection of the first color's removal may be accomplished by visual inspection and/or with a detection device. The detection device may be a UV-lamp if a fluorescent dye was used as the sanding indicator.

In this disclosure, a substrate may be any surface to which a joint compound or spackle can be applied. Non-limiting examples of substrates include wallboard, a wallboard assembly, a joint between two wall panels, a cementitious surface or any other surface in need of repairs, such as for example, a wall and/or ceiling with cracks, or an uneven surface that may be evened by patching. Other substrates are also contemplated and include any substrate to which a joint compound or spackling compound can be applied.

In this disclosure, the term "substrate" is understood broadly and includes any substrate, e.g. gypsum wallboard, gypsum fiberboard, interior walls, exterior walls, ceiling tiles, floor underlayment, floor panels, construction joints, joint tape, nail and/or screw heads, cementitious block, wood, mortar, glass, metal, aluminum, plastic, bricks, stones, paper, ceramic tiles or any combination thereof. The substrate surface may be painted, unpainted, covered with a paper sheet or a fiber mat, and/or otherwise coated or uncoated. The substrate may include joints between two adjacent substrate pieces, such as for example, as a joint between a door frame and a wall, or a joint between two adjacent wall panels. The substrate may include seams between two substrate pieces. The substrate may include a gap between two substrate pieces.

Accordingly, the term "applying to the substrate" includes applying the present joint compound and/or spackling compound over a surface and/or also filling in gaps, seams or joints. The term "applying to the substrate" may also include patching indentations, gaps, cracks and/or other imperfections or defects in the substrate.

In the present methods, a step of sanding may be completed manually, or the sanding process may be automated or semi-automated. A portable sanding machine or sandpaper can be used. In these applications, an end user polishes and smoothens the surface of the dried joint compound until the first color is removed.

The sanding may be completed automatically or semi-automatically with a sanding machine comprising a sensor which detects the first color and transmits this information to a processor which initiates the sanding of the surface with the first color. The sanding removes the first color from the joint compound surface and exposes the second color beneath the first color. A feedback loop stops the sanding once the sensor no longer detects the first color on the joint compound surface and/or the feedback loop may stop the sanding once the sensor detects the presence of the second color.

The presence of the sanding indicator in a joint compound provides the surface with a particular color or tint, or some other detectable marker which is removed upon sanding. Accordingly, this disclosure provides a method which quickly and accurately identifies areas of a substrate, such as for example, as in a wallboard assembly, to which the present joint compound or spackling compound was applied.

A tinted/colored joint compound is often desired by drywall finishers in order to identify and locate areas on a wall to which a joint compound has been applied. However, an undesirable feature of a conventional tinted/colored joint compound is the threat of the color or tint being visible through subsequent wall decorating (e.g. painting). The present joint compounds and spackles have a color/tint that indicates the presence and location of the applied joint compound while minimizing the potential risk of visibility through subsequent decorating because the color is removable by sanding.

The present methods provide additional benefits because there is a visual cue that signals completion of the sanding step. Accordingly, this disclosure provides quality-control methods by which customers can monitor uniformity and completion of sanding. In these methods, completion of the sanding step is indicated in regions where the joint compound does not show the first color/tint and or the joint compound shows the second color/tint.

This allows end-users to quickly identify areas that have been completed and advance to other areas that still need sanding. Thus, the present methods and joint compounds provide savings in time and man-hours. The first color or tagging material may also serve as a quality-control for completion of sanding, as the presence of the first color indicates that the sanding has not been fully completed. The presence of the first color also reveals areas in which the sanding was omitted or was completed only partially.

Because the applied joint compound is easily detected by its first color, the sanding process can be completed by a computerized robot that is programmed to sand the surface until a change from the first color to the second color is detected.

Additionally, the above visual cues for completion of the sanding step and sanding uniformity can be quantitatively measured using various analytical techniques (e.g. colorimetry, fluorimetry, etc.) and represent a response in a feedback loop for an automated sanding process. Once a target second color is detected in a selected region, the automated system may proceed to sanding the next region of the specified first color. The chemical presence of the sanding indicator could be quantitatively measured using various analytical techniques to determine the completion of the sanding step.

Figure 1:
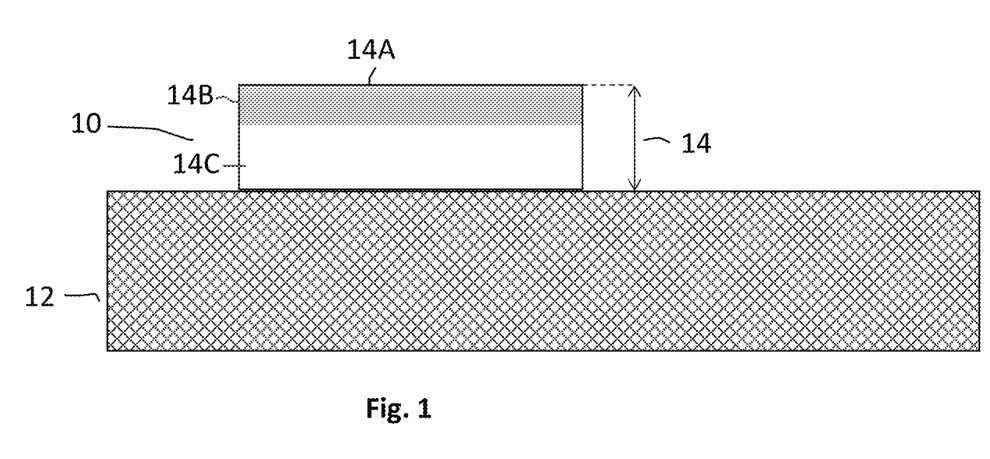
FIG. 1 is a cross-sectional view of a substrate to which a joint compound comprising the sanding indicator was applied. The drawing is not to scale. The joint compound layer has been enlarged in order to highlight the color gradient.

As shown in FIG. 1 which is a cross-sectional view, the present joint compound or spackle (10) is applied to a substrate (12), which may be a wallboard. As can be seen in the cross-sectional view of FIG. 1, this application produces a joint compound (or spackling compound) layer (14) with the air/joint compound surface (14A). After the joint compound (10) has dried/hardened, it produces a color gradient in a first color through the thickness of the joint compound layer (14), with most of the first color (14B) being present near and at the surface (14A). Because the first color (14B) is generally different from a color of the substrate (12), the first color (14B) is distinguishable from the substrate (12). Because the first color (14B) is generally also different from a second color (14C) which is beneath the first color (14B) in the joint compound layer (14), the first color (14B) is distinguishable from the second color (14C).

Accordingly, a positioning of the present joint compound or spackle on the substrate can be easily located. Once the joint compound (10) is sanded, the sanding removes a portion of the joint compound layer (14) near its surface and it also removes the first color (14B) which was mostly concentrated near the surface (14A). The absence of the first color (14B) and/or the exposure of the second color (14C) beneath the first color (14B) serves as an indicator that the sanding process has been completed.

In this disclosure, the "sanding indicator" is defined as a complexometric compound, pH indicator, fluorescent dye, near-infrared dye, dye that produces a color in visual spectrum, and/or a pigment.

Suitable sanding indicators of this disclosure are easily distinguishable from conventional dryness indicators such as those disclosed for spackling compounds in U.S. Pat. No. 6,531,528 at least for two reasons.

First, the conventional dryness indicators, such as phenolphthalein (red) or thymolphthalein (blue), produce a color, e.g., red for phenolphthalein, when a spackling compound is wet, however, after the spackling compound has dried, the color fades away and changes to white. Accordingly, the color of the dried spackling compound with the conventional dryness indicator is not easily distinguishable from a typically white substrate to which the spackling compound has been applied. In contrast to the conventional dryness indicators, joint compounds and/or spackling compounds which comprise the sanding indicator of the present disclosure display a first color at the surface after the joint compound and/or the spackling compound has dried. The first color, which may be yellow or purple, for example, is generally different and distinguishable from a color of the substrate to which the joint compound and/or the spackling compound has been applied.

Second, and as is also shown in FIG. 1, the sanding indicators of this disclosure produce a color gradient in the first color through the thickness of the dried/hardened joint compound and/or spackling compound, with the first color being typically present near and at the surface (14A). The first color (14B) of the dried/hardened joint compound and/or spackling compound comprising the sanding indicator of this disclosure is different and distinguishable from a second color (14C) which is beneath the first color (14B) in the joint compound/spackling compound layer (14). In contrast to the sanding indicators, conventional dryness indicators do not produce an easily detectable color gradient through the thickness of the dried/hardened joint compound and/or the spackling compound. Thus, while phenolphthalein and thymolphthalein are suitable dryness indicators, they are not generally suitable as the sanding indicators of this disclosure in most of the applications.

When the sanding indicator is mixed with the present joint compound or spackling compound, it produces the first color (14B) at the air/joint compound surface, as shown in FIG. 1. The first color is distinguishable from a color of a substrate to which the present joint compound or spackling compound has been applied. The first color can be removed by sanding of the joint compound. Typically, the first color is visible in the light spectrum, but in some embodiments the first color may not be visible in the light spectrum. In these other embodiments, if the first color is fluorescent, it may be detected in the UV spectrum. Other means for detecting the first color, if it is not visible in the light spectrum, may include an infrared lamp.

One of the methods for detecting a color is known as the L*a*b* method, as is described in US patent publication 2019-0203050-A1, the entire disclosure of which is herein incorporated by reference.

Color differences between the first color of the dried joint and/or spackling compound and the second color of the dried joint and/or spackling compound in the present disclosure may be also measured by the L*a*b* method. This method employs a colorimeter such as for example Color-QUEST® from HunterLab. The L*a*b* method allows for the detection of even slight differences between two colors. In the L*a*b* method, color difference is defined as a numerical comparison of a sample's color to a standard. Three different coordinates are used:

L* indicates lightness (black/white), with L*=100 being pure white and L*=0 being pure black;

a* is the red/green coordinate, with a*=−100 being perfectly green, and a*=100 being perfectly red, and b* is the yellow/blue coordinate, with b*=100 being perfectly yellow and b*=−100 being perfectly blue.

All measurements are conducted against standards provided with a colorimeter for each coordinate.

Each of two samples are measured for L*, a* and b*. Delta E (ΔE) is then calculated according to the formula (I) as follows:

$$\Delta E = \sqrt{(L_1^* - L_2^*)^2 + (a_1^* - a_2^*)^2 + (b_1^* - b_2^*)^2} \quad (I)$$

Figure 2:
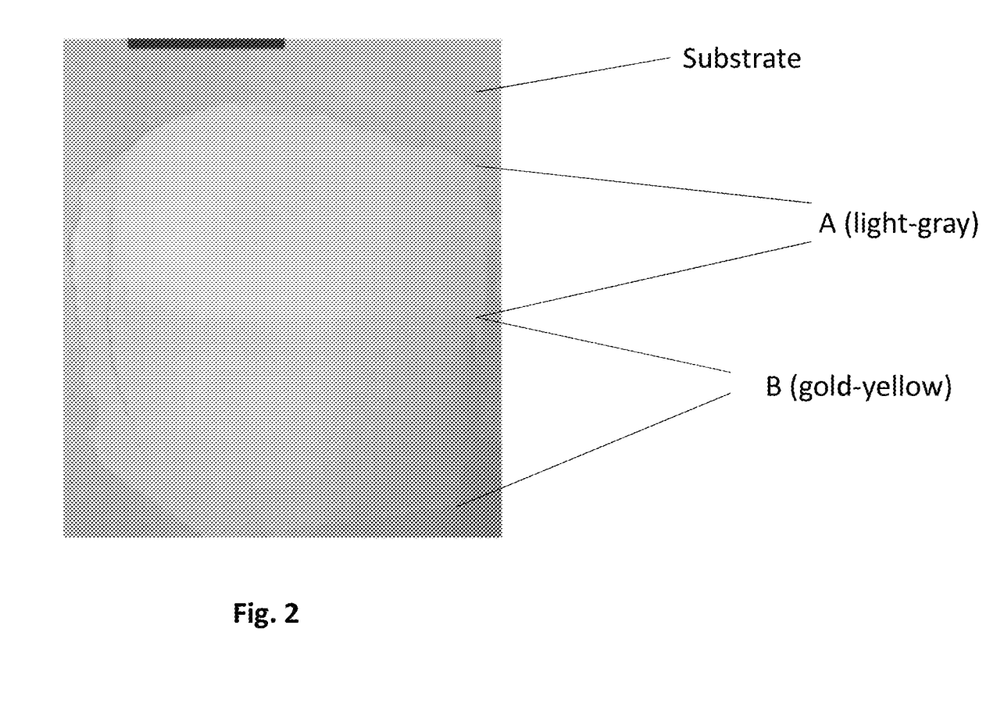
FIG. 2 depicts application to a substrate of a ready-mixed setting-type joint compound which comprises murexide. After the compound has dried, the upper portion (A, light-gray) was sanded and revealed the light grey color, while the bottom portion (B, gold-yellow) was not sanded and remained yellow.

In this disclosure, delta E (ΔE) represents a difference in color between the first color (see 14B in FIG. 1) of an unsanded dried/hardened joint and/or spackling compound at the surface and the second color (see 14C in FIG. 1) of the compound after it has been sanded. See also FIG. 2, wherein ΔE can be calculated according to the formula (I) between colors B and A.

Most humans can easily detect a color change between two colors if delta E between these two colors is 3 or higher. An experienced user is believed to be able to detect a change in color which is as low as 0.5-1 at least in some cases.

Accordingly, suitable sanding indicators of this disclosure include those which produce a first color at the surface of the dried/hardened compound and a second color after the surface has been sanded, wherein the delta E between the first color and the second color is at least 3 or higher, as calculated in the formula (I) by the L*a*b* method with the ColorQUEST® colorimeter from HunterLab at room temperature (70° F.) and by following the instructions provided in the colorimeter manual and using standards provided with the colorimeter.

In the present joint compounds and spackles, one preferred sanding indicator comprises murexide (CAS No: 3051-09-0), also referred to as ammonium purpurate, with the following linear formula $C_8H_8N_6O_6$ and molecular weight 284.19 g/mol, available from Millipore-Sigma. Other salts of purpuric acid may be used as well.

Other preferred sanding indicators include Cresol Red (CAS NO: 1733-12-6), available from Millipore-Sigma, m-Cresol Purple (CAS NO: 2303-01-7), available from Millipore-Sigma, Bromoxylenol Blue (CAS NO: 40070-59-5), available from Millipore-Sigma, and Thymol Blue (CAS NO: 76-61-9), available from Millipore-Sigma.

Other suitable sanding indicators may also include, but are not limited to, Bromocresol Green; Resazurin; 4-phenylazo-1-naphthylamine; ethyl red; 2-(para-dimethylaminophenylazo) pyridine; 4-(p-ethoxyphenylazo)-m-phenylenediamine monohydrochloride; resorcin blue; alizarin red S; methyl red; propyl red; bromocresol purple; chlorophenol red; alizarin; 2-(2,4-dinitrophenylazo) 1-naphthol-3,6-disulfonic acid, disodium salt; bromothymol blue; 6,8-dinitro-2,4-(1H-quinazolinedione); brilliant yellow; phenol red; neutral red; turmeric (curcumin); 4,4'-Bis(4-amino-1-naphthylazo)-2,2'-stilbenedisulfonic acid; p-naphtholbenzein; and ethyl bis (2,4-dimethylphenyl) ethanoate.

It should be noted that certain pH indicators or complexometric indicators may be suitable as dryness indicators, but they do not function efficiently as the sanding indicators in at least some of the conventional joint compounds and/or spackling compound formulations in part because these indicators do not produce a difference between the unsanded first color and the sanded second color with the ΔE value of at least 3 or higher. Accordingly, the following complexometric indicators are not preferred as the sanding indicators: calconcarboxylic acid, Eriochrome Black T and calmagite. The following pH indicators are also not preferred as the sanding indicators for the same reasons: Phenolphthalein, Thymolphthalein and Alizarin Red S.

The sanding indicator according to this disclosure may be used in an amount from 0.001 wt % to 5 wt % of the joint compound or the spackling compound total, excluding water. For example, in order to make 100 g (dry weight only, excluding water) of the present joint compound or spackling compound, from 0.001 g to 5 g of the sanding indicator may be used. The abbreviation "wt %" means weight percent.

It should be understood, that the intensity of the first color at the surface depends on a concentration of the sanding indicator. Most of the sanding indicators according to this disclosure work well in the preferred range from about 0.001 wt % to 0.005 wt % of the joint compound or the spackling compound dry ingredients total, excluding water.

Furthermore, certain formulations of joint compounds and/or spackling compounds may comprise other metal ions in addition to calcium. Such additional metal ions include, but are not limited to, magnesium and zinc. A typical source of zinc may be a set activator used for triggering a setting reaction in a ready-mixed setting type joint compound. A typical source of magnesium includes certain fillers, such as for example, dolomitic limestone, which comprises a combination of calcium carbonate and magnesium carbonate.

Formulations which comprise a combination of magnesium and calcium ions or a combination of zinc and calcium ions may differ in the intensity of the first color and/or the second color from formulations with calcium, but without magnesium or zinc.

Furthermore, a pH of a joint compound and/or spackling compound can be adjusted with one or more acids, bases, and/or buffers. In some embodiments, the intensity of the first color and/or the delta E value between the first color and the second color can be improved by adjusting the pH of the joint compound and/or spackling compound such that the pH is within the designated pH range for the particular sanding indicator.

In preferred embodiments, the sanding indicator comprises one or more of murexide, cresol red, m-cresol purple, bromoxylenol, and/or thymol blue. In some preferred embodiments, the sanding indicator comprises one or more of murexide, cresol red, m-cresol purple, bromoxylenol, and/or thymol blue in an amount from 0.001 wt % to 5 wt % of the joint compound total, excluding water. In further preferred embodiments, the sanding indicator comprises one or more of murexide, cresol red, m-cresol purple, bromoxylenol, and/or thymol blue in an amount from 0.001 wt % to 0.005 wt % of the joint compound total, excluding water.

Any of the sanding indicators according to this disclosure may also comprise at least one solvent which may be water and/or an organic solvent, such as for example as, alcohol or ether. The sanding indicator may also comprise a carrier, a pH stabilizer, a surfactant and/or other components generally known to a person of skill for keeping a formulation stable and miscible with a joint/spackling compound paste.

In some preferred embodiments, the sanding indicator is used in an amount from 0.001 wt % to 0.01 wt % of the joint compound or spackling compound total, excluding water. In some preferred embodiments, the sanding indicator comprises murexide, cresol red, m-cresol purple, bromoxylenol, and/or thymol blue in an amount from 0.001 wt % to 0.01 wt % of the joint compound total, excluding water.

The term "about" in this disclosure means plus/minus 10% of the value, and preferably, plus/minus 1% of the value. For example, about 100 means 100±10, and preferably, 100±1.

The present joint compounds include both drying-type joint compounds and setting-type joint compounds. The present joint compounds may be formulated as a powder, while water and the sanding indicator may be added at the time of the joint compound use. In alternative, the sanding indicator may be premixed with a joint compound powder.

A suitable drying-type joint compound may comprise calcium carbonate and/or any other calcium compound including, but not limited to, calcium oxide, calcium hydroxide, calcium bicarbonate, calcium silicate, calcium nitrate, and calcium chloride. Calcium carbonate may have the highest weight fraction of any ingredient in the joint compound. Calcium carbonate may be present in a form of limestone, dolomitic limestone and/or as any other mineral. Other fillers may include, but are not limited to, one or more of the following: perlite, expanded perlite, talc, mica, and/or hollow ceramic microspheres, ceramic particles, glass beads and/or hollow glass microspheres, polystyrene beads, polyacrylate beads, polyolefin beads or any combination thereof.

Other components in the drying-type joint compound may include fibers, pigments, rheological modifiers, cellulosic derivatives, adhesives such as natural or synthetic latexes, clay minerals such as attapulgite and/or kaolin; and binders such as starch derivatives and/or polymeric binders for cohesive properties.

Suitable cellulose derivatives include, but are not limited to, cellulose ether thickeners, e.g. methyl cellulose, hydroxyethyl cellulose, hydroxypropyl cellulose, or any combinations thereof, or any other cellulose ether thickener typically used in joint and/or spackling compounds.

Suitable clays include, but are not limited to, attapulgite clay, kaolin, illite, bentonite, sepiolite, or any combination thereof.

Suitable binders may include one or more of the following: an acrylic polymer, an acrylic co-polymer or any combination thereof. Acrylic co-polymers include vinyl acrylate, vinyl acetate, styrene acrylate or any combination thereof. Preferred binders include acrylic latex emulsions. Other binders include, but are not limited to, polyvinyl acetate, polyvinyl alcohol, ethylene vinyl acetate co-polymer, styrene butadiene, natural starches, modified starches and synthetic starches, or any combination thereof.

Suitable drying-type joint compound formulations are disclosed in U.S. Pat. Nos. 6,476,099, 6,545,066, 8,931,230 and 9,328,023, incorporated herein by reference. Any of these drying-type joint compounds or any other drying-type joint compounds can be formulated with one or more sanding indicators of the present disclosure.

In one aspect of this disclosure, a drying-type joint compound with the sanding indicator may be formulated as shown in Table 1:

TABLE 1

| Component | Amount (Dry Basis, Excluding Water) |
| --- | --- |
| Filler(s) (e.g. calcium carbonate and optionally, one or more of an additional filler, e.g. calcium sulfate dihydrate, perlite, expanded perlite, talc, mica, glass microspheres, ceramic microspheres) | 50-98.95 wt % dry basis |
| Clays or other rheology modifiers (e.g. kaolin or attapulgite) | 0-25 wt % dry basis |
| Thickener (e.g. cellulose-based thickener, starch) | 0.05-3 wt % dry basis |
| Binder (e.g. latex) | 1-15 wt % dry basis |
| Other additives (e.g. biocide, defoamer, etc.) | 0-10 wt % dry basis |
| Sanding indicator (e.g. murexide, cresol red, m-cresol purple, bromoxylenol, and/or thymol blue) | 0.001 wt % to 5 wt % dry basis |
| Water (water to dry material ratio) | 1:4 to 1:1 |

Suitable joint compounds also include setting-type joint compounds and plasters that contain calcium sulfate hemihydrate ($CaSO_4 \cdot 0.5H_2O$), which rapidly rehydrates to gypsum in the presence of water. This hydration reaction is the driver for the setting action in setting-type joint compounds, plasters and other products formulated with calcium sulfate hemihydrate and water, including a gypsum slurry. A typical setting-type joint compound may also comprise any of the following: a filler, a rheological modifier, a binder, a stabilizer and a biocide. Any of the conventional fillers, rheological modifiers, binders, stabilizers and biocides can be used in the present setting-type joint compound formulations with one or more sanding indicators according to this disclosure, including those as described in connection with drying-type joint compounds.

Suitable setting-type joint compound formulations are provided in U.S. Pat. Nos. 4,661,161, 5,746,822, 6,805,741 and 9,174,881, which are incorporated herein by reference. According to the present disclosure, any of these setting type joint compounds may be formulated with the sanding indicator as provided in this disclosure.

The present setting-type joint compounds include ready-mixed setting-type joint compounds. These compounds are pre-mixed with water and comprise at least one retarder which blocks a setting reaction by reversibly binding calcium until a setting activator is added during application.

A retarder may be a proteinaceous retarder, a low molecular weight polyacrylate and/or non-calcium bearing phosphate. Typically, a retarder is a strong chelating agent such as tetrapotassium pyrophosphate (TKPP), tetrasodium pyrophosphate (TSPP), sodium citrate, among others. Other suitable retarders in this group include zinc hexametaphosphate, potassium tripolyphosphate, sodium tripolyphosphate, mono-ammonium phosphate, monobasic potassium phosphate and any mixtures thereof. Typically, the present pre-mixed setting-type joint compounds comprise from about 0.01 wt % to about 10 wt % of the retarder, based on the weight of dry calcined gypsum.

A setting activator which is also referred interchangeably as an accelerator is added to a ready-mixed, setting-type joint compound at the time of use in order to trigger a setting reaction of calcium sulfate hemihydrate. This allows calcium sulfate hemihydrate to rehydrate and the compound to harden.

Suitable activators include zinc compounds, in particular, zinc sulfate and/or any of zinc sulfate hydrates; aluminum compounds, including aluminum salts such as aluminum sulfate, aluminum ammonium sulfate, and aluminum potassium sulfate; and any combinations thereof. A setting time can be modulated by varying an amount of accelerator added. Typically, from about 0.5 wt % to about 3 wt % of the activator can be used, based on the weight of the joint compound, excluding water. Suitable activators and inhibitors are provided in U.S. Pat. No. 5,746,822, incorporated herein by reference.

For the ready-mixed setting type joint compounds, the sanding indicator may be added to the ready-mixed, setting-type joint compound during manufacturing and/or at the time an activator is added to the ready-mixed, setting-type joint compound during the application of the ready-mixed, setting-type joint compound. In preferred embodiments, the sanding indicator is mixed with the setting type joint compound in an amount from 0.001 wt % to 5 wt % of the composition, excluding water.

The present setting-type joint compounds may comprise from 30 wt % to 90 wt % of calcined gypsum, based on the total weight of the joint compound composition, including water. More preferably, the present joint compounds comprise from 45 wt % to 80 wt % of calcined gypsum by weight of the joint compound composition, including water.

When mixed with water, the present setting-type joint compounds may comprise from about 20 wt % to about 50 wt % water, based on the total weight of the setting-type joint compound composition.

The setting-type joint compounds may also comprise one or more of the following: calcium carbonate, limestone, perlite, expanded perlite, hollow glass microspheres, hollow ceramic microspheres, talc and/or mica. If present, these components may be used in an amount from about 1% to about 40% by weight, based on the weight of dry calcined gypsum. Clay, such as attapulgite clay, may be used in an amount from about 1% to about 10% by weight, based on the weight of dry calcined gypsum.

The present setting-type joint compounds comprise one or more binders, such as a latex binder, e.g. acrylic acid polymer or acrylic acid copolymer, and/or starch. Other binders typically used in a joint compound formulation can be also used.

Typically, from about 1 wt % to about 20 wt % of the binder may be used, based on the dry weight of calcined gypsum. For example, if 100 g of dry calcined gypsum is used, an amount of the binder may be in the range from about 1 g to about 20 g.

Other components in the present setting-type joint compound mixture may include one or more of the following: a thickener/rheological modifier, pH stabilizer, biocide, defoamer, preservative and/or wetting agent. Typically, each of these components may comprise from about 0.01% to about 10% by weight of the joint compound, excluding water. A person of skill can find a detailed list of thickener/rheological modifiers, pH stabilizers, biocides, defoamers, preservatives and/or wetting agents in prior patents related to joint compounds, such as for example, U.S. Pat. No. 8,931,230.

Further aspects of this disclosure include spackling compounds comprising one or more of the sanding indicators according to this disclosure.

Suitable spackling compounds include those disclosed in U.S. Pat. Nos. 4,391,647, 6,358,309, and 7,790,796, and US patent publication 2015/179476. Typically, a spackling compound comprises from about 10 wt % to about 70 wt % of a filler, which may be one or more of silica, calcite (calcium carbonate), dolomite, etc. Other components in a spackling compound include water and a binder. Other additives may include a thickener, a plasticizer, dispersant, defoamer, and/or other conventional additives used for production of spackling and similar materials.

Other fillers may include, but are not limited to, one or more of the following: perlite, expanded perlite, talc, mica, and/or hollow ceramic microspheres, ceramic particles, glass beads and/or hollow glass microspheres, polystyrene beads, polyacrylate beads, polyolefin beads or any combination thereof.

Other components may include one or more of the following: fibers, pigments, rheological modifiers, cellulosic derivatives, adhesives such as natural or synthetic latexes, clay minerals such as attapulgite and/or kaolin; and binders such as starch derivatives and/or polymeric binders for cohesive properties.

Suitable cellulose derivatives include, but are not limited to, cellulose ether thickeners, e.g. methyl cellulose, hydroxyethyl cellulose, hydroxypropyl cellulose, or any combinations thereof, or any other cellulose ether thickener typically used in joint and/or spackling compounds.

Suitable clays include, but are not limited to, attapulgite clay, kaolin, illite, bentonite, sepiolite, or any combination thereof.

Suitable binders may include one or more of the following: an acrylic polymer, an acrylic co-polymer or any combination thereof. Acrylic co-polymers include vinyl acrylate, vinyl acetate, styrene acrylate or any combination thereof. Preferred binders include acrylic latex emulsions. Other binders include, but are not limited to, polyvinyl acetate, polyvinyl alcohol, ethylene vinyl acetate co-polymer, styrene butadiene, natural starches, modified starches and synthetic starches, or any combination thereof.

A spackling compound with the sanding indicator according to this disclosure may be formulated as shown in Table 2:

TABLE 2

| Component | Amount (Dry Basis, Excluding Water) |
|---|---|
| Filler (calcium carbonate) | 65-99.3 wt % dry basis |
| Additional filler (perlite) | 0-10 wt % dry basis |
| Clays or other rheology modifiers (attapulgite clay) | 0.1-5 wt % dry basis |
| Other thickening clays | 0-5 wt % dry basis |
| Cellulosic thickener | 0.1-5 wt % dry basis |
| Binder | 0.5-5 wt % dry basis |
| Other additives (preservative, pH buffer, surfactant, etc.) | 0-5 wt % dry basis |
| Sanding indicator (e.g. murexide, cresol red, m-cresol purple, bromoxylenol, and/or thymol blue) | 0.001 wt % to 5 wt % dry basis |
| Water (water to dry material ratio) | 1:5-4:5 (preferably 3:5) |

Prior to the addition of the sanding indicator, the present joint compound or spackle is of a certain color, which typically, but not necessarily, is white. Addition of the sanding indicator may result in a detectable color change, based on the available ionic species, pH, or other properties. Applying the present joint compound to a substrate produces a color gradient with the first color detectable near the air-joint compound surface.

Without wishing to be bound by a theory, it is possible that there is a concentration gradient with higher concentrations of the sanding indicator near the air-joint compound interface and lower concentrations of the indicator near the substrate, as in a concentration boundary layer at an interface. The presence of higher concentrations of the sanding indicator near the surface, changes in pH, chemical reactions, such as for example oxidation, and/or some other factors produce the surface with the first color, which in many embodiments can be detected simply by visual inspection. Upon removal of the topmost surface layer via sanding, the first color is removed.

The selected sanding indicator may be added directly to the joint compound or spackle at the point of manufacturing or it can be provided as an accessory separate product which is then added by the end-user at the time of application.

The sanding indicator may be added to the present joint compound or spackle in its original form, as a powder, solution/gel, or as a dry powder with other dry filler materials.

In alternative, the sanding indicator may be formulated as a dry powder and coated on some carrier material. Any of the dry components of a conventional joint compound can be used as a carrier material. Suitable carriers include a calcium compound, talc, sodium salt, e.g. sodium chloride or sodium sulfate, and/or magnesium salt. Calcium carbonate and gypsum are particularly preferred compounds. A carrier may be a filler (i.e. talc or mica) commonly used in joint compounds and spackles. These indicator formulations which comprise a mixture of the sanding indicator with a carrier may be used either as an accessory product or they may be also used in any other applications in order to improve mixing of the sanding indicator with a joint compound or any other product.

In further embodiments, the sanding indicator may be added in combination with other additives, including, but not limited to, accelerators and/or retarders. In further aspect, the present disclosure provides an accessory product comprising the sanding indicator. Preferably, the accessory product comprises murexide.

An accessory product comprising the sanding indicator may be provided in a separate package. The amount of the sanding indicator may be dosed such that no additional measurements are needed during mixing with a joint compound or spackling compound. The package may be of any shape. It may be a container, a pre-filled syringe and/or bottle. A flexible bag or pouch is particularly preferred. A package may provide the sanding indicator in predetermined dosages. The package may comprise several compartments, each compartment containing a predetermined dosage of the sanding indicator. A predetermined dosage may be calculated as the dosage needed to produce a color change in a particular volume of a joint compound (i.e. one gallon, including water) or any other product for monitoring sanding.

During application of an accessory product comprising the sanding indicator, an end-user may apply one or several dosages of the indicator, depending on the amount of a product to be monitored.

The sanding indicator in the package may be formulated as a powder or as a paste pre-mixed with a solvent which may be water or an organic solvent, e.g. alcohol. Other components in the accessory product may include a stabilizer and/or a carrier. The product may be buffered in order to keep a certain pH, as needed.

In preferred embodiments, the accessory product comprises the sanding indicator which comprises one or more of the following: murexide, cresol red, m-cresol purple, bromoxylenol, and/or thymol blue.

In another aspect, the present disclosure provides a method for patching a substrate. The method comprises applying to the substrate a spackling compound formulated with one or more of the sanding indicators of this disclosure. The method may further comprise sanding the joint or spackling compound after the joint or spackling compound has dried and displays a first color at the air/joint compound.

In yet another further aspect, the present disclosure provides methods for making a joint compound and/or a spackling compound. The methods comprise mixing a drying-type joint compound composition, setting-type joint compound composition or a spackling compound composition with at least one sanding indicator according to this disclosure. The methods may comprise mixing together at least one filler and at least one sanding indicator according to this disclosure and further mixing the filler(s) and the sanding indicator(s) with at least water and at least one binder.

Example 1

Twenty mg of murexide was added to 200 g of a ready-mixed setting-type joint compound. Mixing of murexide with the joint compound revealed a color change from a light gray to a light peach color, which, without wishing to be bound by a theory, could be because of a formation of a metal complex between murexide and available $Ca^{2+}$ ions. Upon addition of zinc sulfate and aluminum sulfate to activate the setting reaction, the joint compound changed its color to gold yellow. The joint compound was then applied to wallboard and was allowed to dry. After the joint compound had dried, the joint compound's surface remained gold yellow. See FIG. 2, bottom portion (B, gold yellow). The thickness of the gold yellow (first color) layer was measured by using optical microscopy and it was determined to be approximately 100 microns or less.

The gold yellow color was removed by sanding a portion of the surface of the dried joint compound. The sanded joint compound surface was light gray. The light gray color was blending easily with the substrate's color. See FIG. 2, upper portion (A, light gray) and compare it to the bottom portion (B, gold yellow) which was not sanded and remained gold yellow.

Example 2

Spackling compound samples with calcium carbonate as a primary filler material were prepared according to Table 2 with one of the following sanding indicators: Thymol Blue, m-Cresol Purple, Cresol Red, Bromothymol Blue, Bromoxylenol Blue or Alizarin Red S. Each of the sanding indicators was tested in two different concentrations: 0.001 wt % dry weight of the joint compound total, excluding water, or 0.005% wt % dry weight of the joint compound total, excluding water. See Table 3 shown in FIG. 4.

Two different formulations of the joint compound were used: with or without $Mg(OH)_2$. See Table 3 shown in FIG. 4.

Each of the joint compound formulations was applied to a substrate and was allowed to dry.

A first color at the surface of each dried joint compound sample was examined by the L*a*b* method with the ColorQUEST® colorimeter from HunterLab at room temperature (70° F.). The L* value, the a* value and the b* value were measured and recorded for each spackling compound, as shown in Table 3 of FIG. 4.

The surface of each of the samples was then sanded and the sanded surfaces were examined for the second color by the L*a*b* method with the ColorQUEST® colorimeter from HunterLab at room temperature (70° F.). The L* value, the a* value and the b* value were measured and recorded for each joint compound, as shown in Table 3 of FIG. 4.

The delta E value was then calculated according to the formula (I) for each sanding indicator between the first color (unsanded dry spackling compound) and the second color (sanded, dry spackling compound).

According to these calculations, the sanding indicators are listed below in the order of the most to the least effective in sanding applications:

1) Cresol Red—ΔE=8
2) m-Cresol Purple—ΔE=5
3) Bromoxylenol—ΔE=4
4) Thymol Blue—ΔE=3
5) Bromothymol blue—ΔE=2
6) Alizarin Red S—ΔE=0.5

Note that ΔE<3 is not a detectable color difference to the naked eye. Accordingly, bromothymol blue or alizarin red S are not suitable sanding indicators under the tested conditions.

Figure 4:
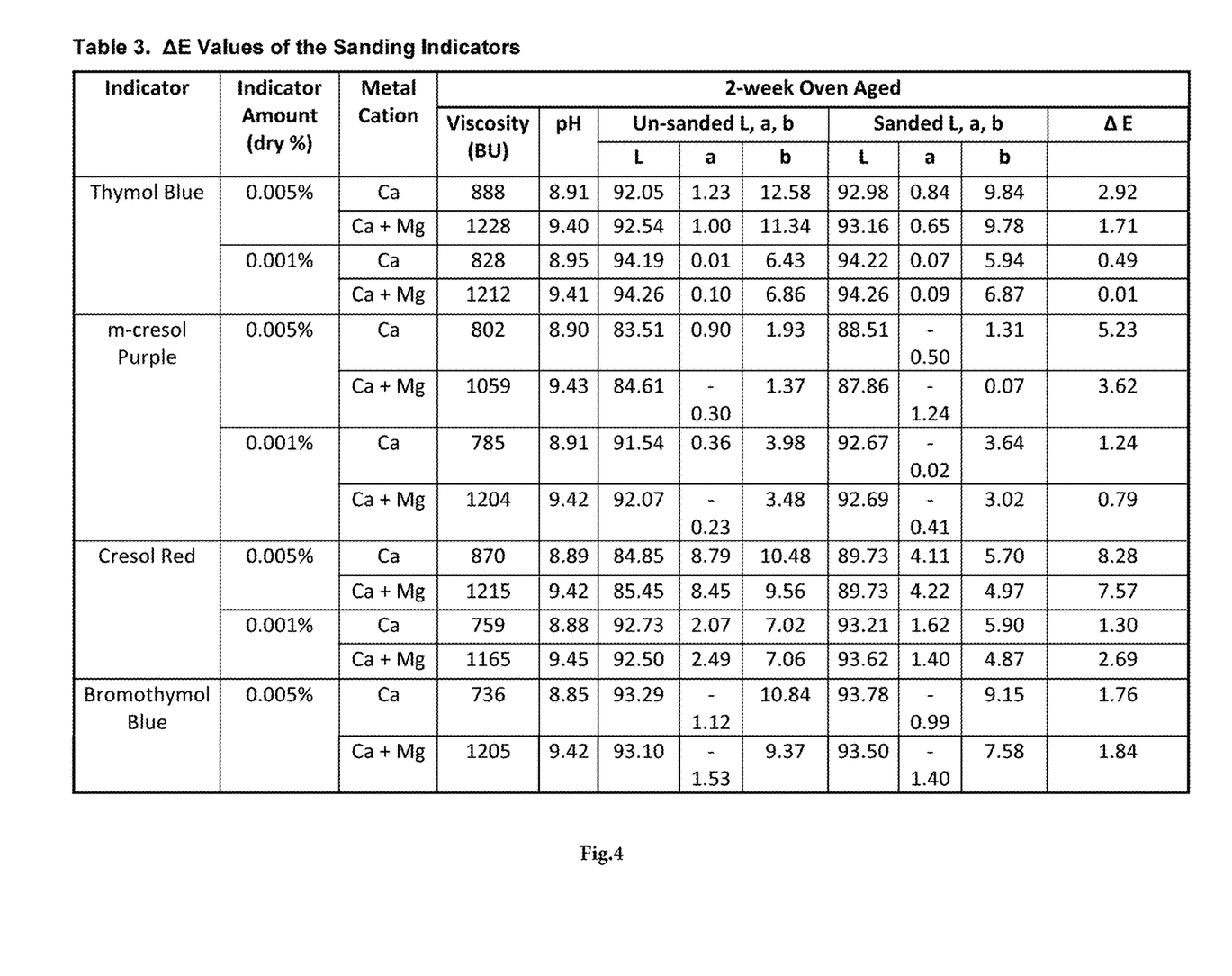
FIG. 4 depicts Table 3 listing ΔE Values of the Sanding Indicators.

In Table 3 of FIG. 4, viscosity units are Brabender units (BU). The viscosity was measured according to ASTM C474-05, Section 5 using a CW Brabender viscometer with a Type-A Pin, sample cup size of ½ pint with a 250 cm-gm cartridge Brabender Torque-Head and an RPM of 75 at room temperature (70° F.). One of ordinary skill in the art will further recognize that 1 Brabender unit (BU) equals to about 2 mPa·s or 2 cP.

The result reported in Table 3 of FIG. 4 was confirmed by drying spackling compound samples in petri dishes and comparing the intensity of the first color at the top of the petri dish versus the second color at the bottom of the petri dish by visual inspection. These results are shown in FIG. 3A.

The order of petri dishes in each row in FIG. 3A from left to right is as follows: a sanding indicator at 0.001% dry basis (w, w/o Mg(OH)$_2$) and 0.005% dry basis (w, w/o Mg(OH)$_2$) for the first color (the top of the petri dish) and then the same sanding indicator at 0.001% dry basis (w, w/o Mg(OH)$_2$) and 0.005% dry basis (w, w/o Mg(OH)$_2$) for the second color (the bottom of the petri dish).

See also 3B which is a cross-sectional view of the 0.005% concentration samples without Mg(OH)$_2$.

Figure 3A:
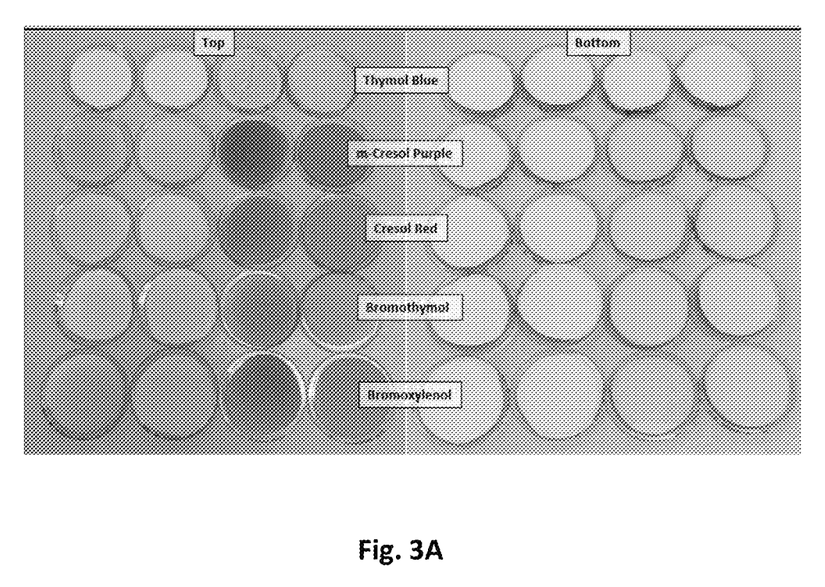
FIG. 3A depicts dried spackling compound samples formulated with various sanding indicators according to this disclosure.
Figure 3B:
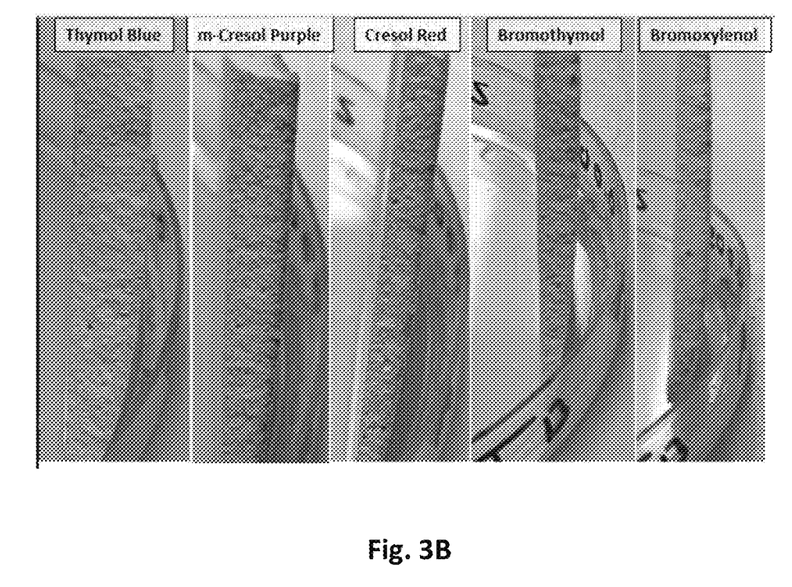
FIG. 3B depicts cross-sectional views of the dried spackling compound samples of FIG. 3A.

As can be seen in FIGS. 3A and 3B, the difference between the first color and the second color is easily detectable by visual inspection for the sanding indicators with ΔE=3 and higher.

Example 3

A spackling compound was prepared with one of the following sanding indicators: calconcarboxylic acid, murexide, Eriochrome black T or calmagite. Each of the sanding indicators was tested at 0.005 wt % dry weight of the spackling compound total, excluding water. See Table 4 in FIG. 5.

Three different formulations of the spackling compound were used: with Mg(OH)$_2$, with zinc oxide(ZnO), or without ZnO or Mg(OH)$_2$. See Table 4 in FIG. 5.

Each of the spackling compound formulations was applied to a substrate and was allowed to dry.

A first color at the surface of each dried joint compound was examined by the L*a*b* method with the ColorQUEST® colorimeter from HunterLab at room temperature (70° F.). The L* value, the a* value and the b* value were measured and recorded for each joint compound, as shown in Table 4 of FIG. 5.

The surface of each of the samples was then sanded and the sanded surfaces were examined for the second color by the L*a*b* method with the ColorQUEST® colorimeter from HunterLab at room temperature (70° F.). The L* value, the a* value and the b* value were measured and recorded for each joint compound, as shown in Table 4 shown in FIG. 5.

The delta E value was then calculated according to the formula (I) for each sanding indicator between the first color (unsanded dry spackling compound) and the second color (sanded, dry spackling compound). In Table 4 of FIG. 5, viscosity units are Brabender units (BU). The viscosity was measured according to ASTM C474-05, Section 5 using a CW Brabender viscometer with a Type-A Pin, sample cup size of ½ pint with a 250 cm-gm cartridge Brabender Torque-Head and an RPM of 75 at room temperature (70° F.). One of ordinary skill in the art will further recognize that 1 Brabender unit (BU) equals to about 2 mPa·s or 2 cP.

Figure 5:
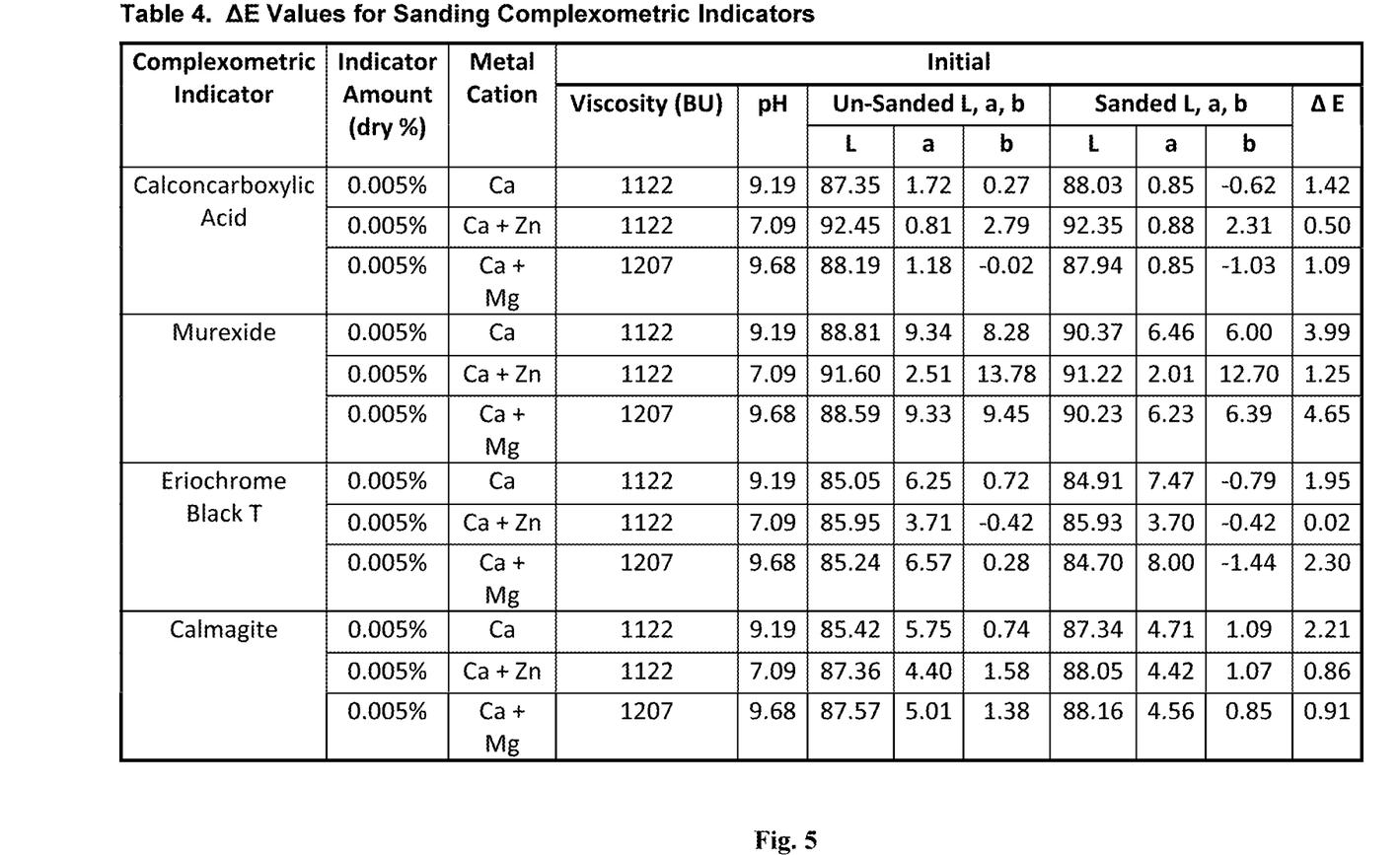
FIG. 5 depicts Table 4 listing ΔE Values for Sanding Complexometric Indicators.

As can be seen in Table 4 of FIG. 5, zinc ions impact the delta E values. Furthermore, and even in the absence of zinc ions, only murexide produces the delta E value at the required range of 3 for visual inspection. Accordingly, calconcarboxylic acid, Eriochrome Black T or calmagite are not suitable as sanding indicators under the test conditions.

What is claimed is:

1. A joint compound or a spackling compound comprising: one or more fillers, one or more binders and a sanding indicator comprising murexide, cresol red, m-cresol purple, bromoxylenol, thymol blue, or any combination thereof, and wherein the joint compound or spackling compound displays a first color at the air/joint compound surface after the joint compound or the spackling compound has dried or hardened, wherein the first color is distinguishable from a second color of the joint compound beneath the air/joint compound surface.

2. The joint compound or spackling compound of claim 1, wherein the sanding indicator is in an amount from 0.001 wt % to 5 wt % of the joint compound or spackling compound total, excluding water.

3. A method for analyzing the air/joint compound surface of the joint compound or spackling compound of claim 1, the method comprising:
   1) inspecting the surface for the presence of the first color after the surface was sanded, and
   2) determining that additional sanding is needed if the first color is detected at the surface.

4. The method of claim 3, wherein the surface is inspected by visual inspection and/or with a device which detects the first color.

5. A method for patching a substrate, wherein the method comprises applying to the substrate the spackling compound of claim 1.

6. The method of claim 5, wherein the method further comprises sanding the spackling compound after the spackling compound has dried and displays a first color at the air/joint compound interface.

7. A method of making the joint compound or the spackling compound of claim 1, wherein the method comprises mixing a drying-type joint compound composition, a setting-type joint compound composition or a spackling compound composition with the sanding indicator.

8. A method for finishing a substrate, the method comprising:
   a) applying to the substrate the joint compound or the spackling compound of claim 1 wherein the joint compound or the spackling compound displays a first color at the air/joint compound surface, wherein the first color is distinguishable from the substrate's color and wherein the first color at the surface is also distinguishable from a second color of the joint compound beneath the surface; and
   b) sanding the surface of the joint compound or the spackling compound until the first color is removed from the surface.

9. The method of claim 8, wherein the substrate is a wallboard assembly, gypsum wallboard, gypsum fiberboard, interior wall, exterior wall, ceiling tile, floor underlayment, floor panel, construction joint, joint tape, nail and/or screw head, cementitious block, wood, mortar, glass, metal, aluminum, plastic, brick, stone, paper, ceramic tile or any combination thereof.

10. The method of claim 8, wherein the step of sanding comprises detecting the first color with a sensor which is in communication with a processor which initiates the sanding of the surface with the first color by a sanding machine until the sensor detects that the first color has been removed and/or the sensor detects a second color.

* * * * *